(12) United States Patent
Schiehlen et al.

(10) Patent No.: US 9,051,008 B2
(45) Date of Patent: Jun. 9, 2015

(54) DRIVER ASSISTANCE SYSTEM

(75) Inventors: Joachim Schiehlen, Germering (DE);
Jan Felten, Rochester Hills, MI (US);
Soeren Hohmann, Munich (DE);
Mihiar Ayoubi, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 2271 days.

(21) Appl. No.: 11/875,456

(22) Filed: Oct. 19, 2007

(65) Prior Publication Data

US 2008/0033614 A1 Feb. 7, 2008

Related U.S. Application Data

(63) Continuation of application No. PCT/EP2006/003229, filed on Apr. 8, 2006.

(30) Foreign Application Priority Data

Apr. 22, 2005 (DE) .......... 10 2005 018 688

(51) Int. Cl.
*B62D 6/00* (2006.01)
*G01S 13/00* (2006.01)
(Continued)

(52) U.S. Cl.
CPC .......... *B62D 15/029* (2013.01); *B60T 2201/08* (2013.01); *B60T 2201/087* (2013.01); *B60W 30/08* (2013.01); *B60W 40/02* (2013.01); *B62D 15/025* (2013.01); *B62D 15/0265* (2013.01)

(58) Field of Classification Search
CPC .............. B62D 15/025; B62D 15/0265; B60T 2201/08; B60T 2201/087; B60T 2201/083
USPC ............. 701/41; 342/71; 340/435; 250/208.1
See application file for complete search history.

(56) References Cited

U.S. PATENT DOCUMENTS

| | | | |
|---|---|---|---|
| 5,925,082 A | 7/1999 | Shimizu et al. | |
| 2004/0016870 A1* | 1/2004 | Pawlicki et al. | ........... 250/208.1 |

(Continued)

FOREIGN PATENT DOCUMENTS

| | | |
|---|---|---|
| DE | 197 02 383 A1 | 8/1997 |
| DE | 198 18 259 A1 | 11/1998 |

(Continued)

OTHER PUBLICATIONS

German Search Report dated Dec. 16, 2005 with English Translation (Nine (9) pages).

(Continued)

*Primary Examiner* — Redhwan K Mawari
*Assistant Examiner* — Rodney P King
(74) *Attorney, Agent, or Firm* — Crowell & Moring LLP

(57) ABSTRACT

A driving aid system is provided for assisting a motor vehicle during a change of lane. The system includes a device monitoring the lateral side space and a device monitoring the directional stability. The lateral space monitoring device is designed to determine the degree of risk (for example, two levels: dangerous/not dangerous, or three levels: low/medium/high risk) represented by a change of lane. At the high risk level, a first driving aid reaction occurs, at least in the form of a counter-steering, which is regulated by a link existing between the lateral space monitoring device and the directional stability monitoring device and is expressed by a reorientation towards the specific traffic lane or by maintaining the directional stability. At the low risk level, a second driving-aid reaction is triggered, which is less perceptible and depends on the degree of likelihood of the intention to change lane.

7 Claims, 1 Drawing Sheet

(51) Int. Cl.
  *B60Q 1/00* (2006.01)
  *B62D 15/02* (2006.01)
  *B60W 30/08* (2012.01)
  *B60W 40/02* (2006.01)

(56) References Cited

U.S. PATENT DOCUMENTS

2004/0262063 A1 12/2004 Kaufmann et al.
2005/0015203 A1* 1/2005 Nishira .................... 701/301
2007/0233343 A1* 10/2007 Saito et al. ............... 701/41
2008/0243337 A1* 10/2008 Tsuda ...................... 701/41

FOREIGN PATENT DOCUMENTS

| DE | 100 39 795 C2 | 3/2002 |
| DE | 102 26 481 A1 | 1/2004 |
| DE | 102 54 247 A1 | 6/2004 |
| DE | 103 10 501 A1 | 9/2004 |
| DE | 103 18 741 A1 | 11/2004 |
| EP | 0 640 903 B1 | 3/1997 |
| EP | 1 312 499 A2 | 5/2003 |

OTHER PUBLICATIONS

International search Report dated Jul. 6, 2006 with English Translation (Four (4) pages).

* cited by examiner

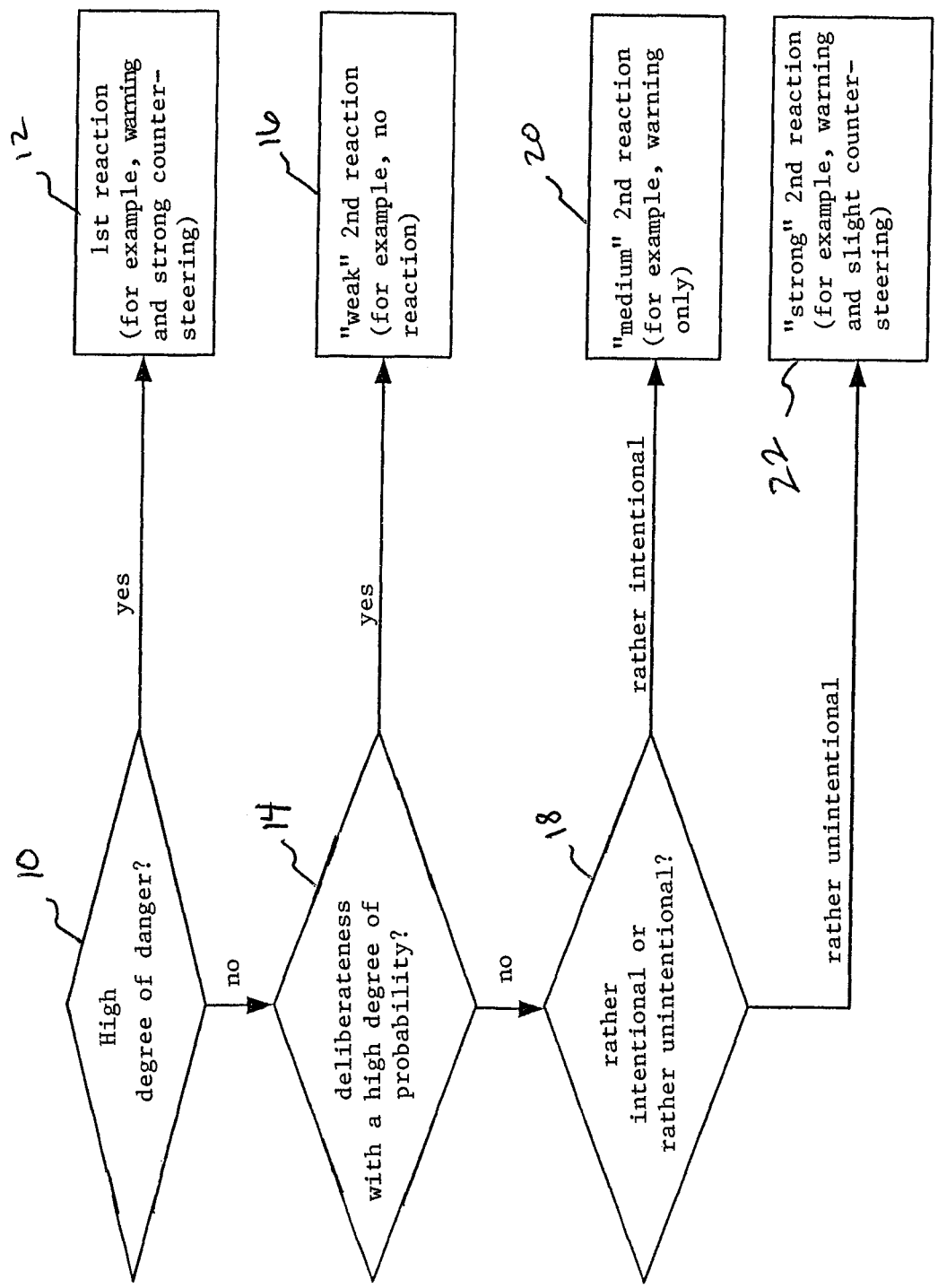

DRIVER ASSISTANCE SYSTEM

CROSS-REFERENCE TO RELATED APPLICATIONS

This application is a continuation of PCT International Application No. PCT/EP2006/003229, filed Apr. 8, 2006, which claims priority under 35 U.S.C. §119 to German Application No. 10 2005 018 688.2, filed Apr. 22, 2005, the entire disclosures of which are expressly incorporated by reference herein.

BACKGROUND AND SUMMARY OF THE INVENTION

The invention relates to a driver assistance system for assisting the driver of a motor vehicle during a change of lane. The system includes a side area monitoring device and a lane directional stability monitoring device.

A driver assistance system of the above-described type is known, for example, from German Patent document DE 103 18 741 A1. Furthermore, a plurality of so-called lane changing assistants are known, which warn the driver by way of a side area monitoring device in the event of danger caused by passing vehicles or by vehicles in the blind spot range of the driver. A plurality of so-called lane directional stability monitoring devices (also frequently called "heading control" or "lane departure warning"), which recognize the vehicle's own traffic lane and which warn the driver and/or have a counter-steering effect in the event of a driving-out of the defined lane (for example, veering from one's own traffic lane). With respect to the technical background, reference is, for example, also made to the following patent literature: European Patent document EP 0 640 903 B1, German Patent document DE 197 02 383 A1 and German Patent document DE 102 26 481A.

It is an object of the invention to improve a driver assistance system having a side area monitoring device.

According to the invention, a driver assistance system is provided for assisting the driver of a motor vehicle during a change of lane. The system includes a side area monitoring device and a lane directional stability monitoring device. The side area monitoring device determines the degree of danger for a lane change and, in the event of a high degree of danger, independently of the degree of probability of the deliberateness of leaving the lane, causes a first driver-aid reaction at least in the form of a counter-steering, which is controlled by a connection between the side area monitoring device and the lane directional stability monitoring device, in the sense of steering back into the defined traffic lane or maintaining the directional stability within a lane. Advantageous further developments of the invention are described and claimed herein.

The driver assistance system for supporting the driver of a motor vehicle when leaving a defined lane is equipped with a side area monitoring device and with a lane directional stability monitoring device. The side area monitoring device is further developed such that it determines the degree of danger (for example, in two stages: dangerous/not dangerous; or in three stages: low/medium/high danger) for a lane change. In the event of a high degree of danger (for example, dangerous in the case of two stages; high danger in the case of three stages), a first driver-aid reaction occurs at least in the form of a counter-steering, which is controlled by a coupling between the side area monitoring device and the lane directional stability monitoring device with respect to lane maintenance. This takes place independently of the deliberateness with which the driver leaves the defined lane, particularly when leaving his own traffic lane.

The degree of danger is, for example, considered to be high when the side area monitoring device detects a fast-approaching vehicle in the passing lane. The degree of danger is, for example, considered to be low when the side area monitoring device detects a free or open passing lane.

In the case of a rather low degree of danger (for example, not dangerous, in a two-stage system; low or medium danger, in a three-stage system) determined by the side area monitoring device, the device preferably determines a degree of probability (for example, in a two stage system: likely intentional, likely unintentional; or in a three stage system: intentional, likely intentional, likely unintentional) with respect to the deliberateness of leaving the lane. In this case, the driver's likely intention is detected, for example, based upon his vehicle handling.

In the case of a low degree of probability (likely unintentional), a second driver-aid reaction is triggered.

As required, in the case of a high degree of probability (intentional or likely intentional), a second driver-aid reaction can be triggered, which influences the driver less than the second reaction in the case of a low degree of probability of the deliberateness of leaving the lane. Here, the second reaction in the case of a rather low degree of probability of the deliberateness of leaving the lane may be identical to the first reaction, and the second reaction in the case of a somewhat higher degree of probability of the deliberateness of leaving the lane may be no reaction. The first reaction preferably is a warning and a strong counter-steering. In a graduated manner, as a function of the degree or probability of the deliberateness of leaving the lane, the second reaction may, for example, be a warning and a slight counter-steering in a first stage; only a warning in a second stage; and no reaction in a third stage. A strong and slight counter-steering is defined, for example, by the respective pressure force required for overcoming the counter-steering reaction.

The degree of probability of the deliberateness of leaving the lane is assumed to be high, for example, when the turn signal is on. As an alternative or in addition, the degree of probability of the deliberateness of leaving the lane can be assumed to be rather higher when the speed at which the defined lane is being left is higher than a defined threshold and/or when the vehicle is accelerated. As an alternative or in addition, the degree of probability of the deliberateness of leaving the lane can also be assumed to be rather high when the distance to the vehicle driving ahead is considerably reduced.

Other objects, advantages and novel features of the present invention will become apparent from the following detailed description of the invention when considered in conjunction with the accompanying drawings.

BRIEF DESCRIPTION OF THE DRAWING

The drawing shows a flow chart of a particularly advantageous embodiment, in which the degree of danger is taken into account in two stages, and the degree of probability of the deliberateness of leaving the lane is taken into account in three stages.

DETAILED DESCRIPTION OF THE DRAWING

Referring to the drawing, the driver assistance system initially inquires as to whether there is a high degree of danger with respect to a vehicle lane change (block 10). If yes, then a first driver-aid reaction is performed (block 12). The first driver-aid reaction may be, for example, a warning to the driver and a strong counter-steering to be overcome by the driver.

In the event that there is not a high degree of danger, then the driver assistance system inquires as to whether the probability of the deliberateness of leaving the lane is high (block 14). If there is a high degree of probability that the lane departure was deliberate, then the driver assistance system causes a "weak" second driver-aid reaction (block 16). Such a weak second driver-aid reaction could be, for example, an extremely minimal or no reaction.

In the event the driver assistance system determines that there is not a high degree of probability that a lane departure is deliberate, the system determines whether the lane change is likely intentional or likely unintentional (block 18). If the lane change is likely intentional, then a second driver-aid reaction is triggered, which may take the form of a "medium" second driver-aid reaction such as only a warning or only a warning and/or a slight counter-steering (block 20). On the other hand, if the system determines that the lane change is likely unintentional, then a second driver-aid reaction is triggered that may be a "strong" second driver-aid reaction such as a warning and a counter-steering (block 22).

Thus, the invention is based on the following recognitions. Previously, side area monitoring devices and lane directional stability devices were always considered separately or provided as separate systems in vehicles. The invention creates a synergetic effect by combining the two systems in order to provide a new function. Specifically, an isolated side area monitoring device with a counter-steering reaction is problematic, because an inappropriate counter-steering (for example, due to a lack of information from the lane directional stability monitoring device concerning the defined traffic lane) may actually lead to the leaving of the defined lane (if the latter, for example, describes a curve). The present invention solves this problem.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for assisting a driver of a motor vehicle during a lane departure, the method comprising the acts of:
   determining at least a low degree of danger and a high degree of danger for a lane departure via a side area monitoring device of the vehicle, wherein the low degree of danger corresponds to when the side area monitoring device detects an open passing lane and the high degree of danger corresponds to when the side area monitoring detects that the passing lane is not open;
   determining a deliberateness of the driver in departing the lane;
   upon determining the high degree of danger, triggering a first driver-aid reaction at least in a form of a first counter-steering of the vehicle for steering the vehicle back into the lane, wherein the first counter-steering has a strength that is independent of the determined deliberateness of the lane departure, and wherein the triggering is controlled by a coupling between the side area monitoring device and a lane directional stability monitoring device; and
   upon determining the low degree of danger, triggering a second driver-aid reaction as a function of the determined deliberateness of leaving the lane, wherein the second driver-aid reaction comprises a second counter-steering having a strength that is proportional to the determined deliberateness of the lane departure.

2. The method according to claim 1, wherein upon determining the low degree of danger and the lane change to be deliberate, no second driver-aid reaction is triggered.

3. The method according to claim 1, further comprising the act of determining whether a turn signal of the vehicle is on; and
   determining that the lane change is deliberate when the turn signal is determined to be on.

4. The method according to claim 1, further comprising the acts of:
   determining a vehicle speed at which the defined lane is being left;
   determining whether the vehicle is being accelerated as the defined lane is left; and
   determining the lane change to be deliberate when at least one of the determined speed is greater than a defined threshold and the vehicle is being accelerated.

5. The method according to claim 1, further comprising the act of calculating a distance from the vehicle to the preceding vehicle ahead; and
   determining the lane change to be deliberate when the calculated distance is decreasing.

6. The method according to claim 1, wherein the first driver-aid reaction further comprises a first warning and the second driver-aid reaction comprises a second warning, wherein the second warning is proportional to the determined deliberateness of leaving the lane.

7. The method according to claim 1, wherein triggering the first driver-aid reaction upon determining the high degree of danger further comprises triggering the first driver-aid reaction independently of the determined deliberateness.

* * * * *